W. B. HODGE.
AUTOMATIC CONTROL FOR HUMIDIFYING APPARATUS.
APPLICATION FILED MAR. 21, 1916.
1,270,159.
Patented June 18, 1918.
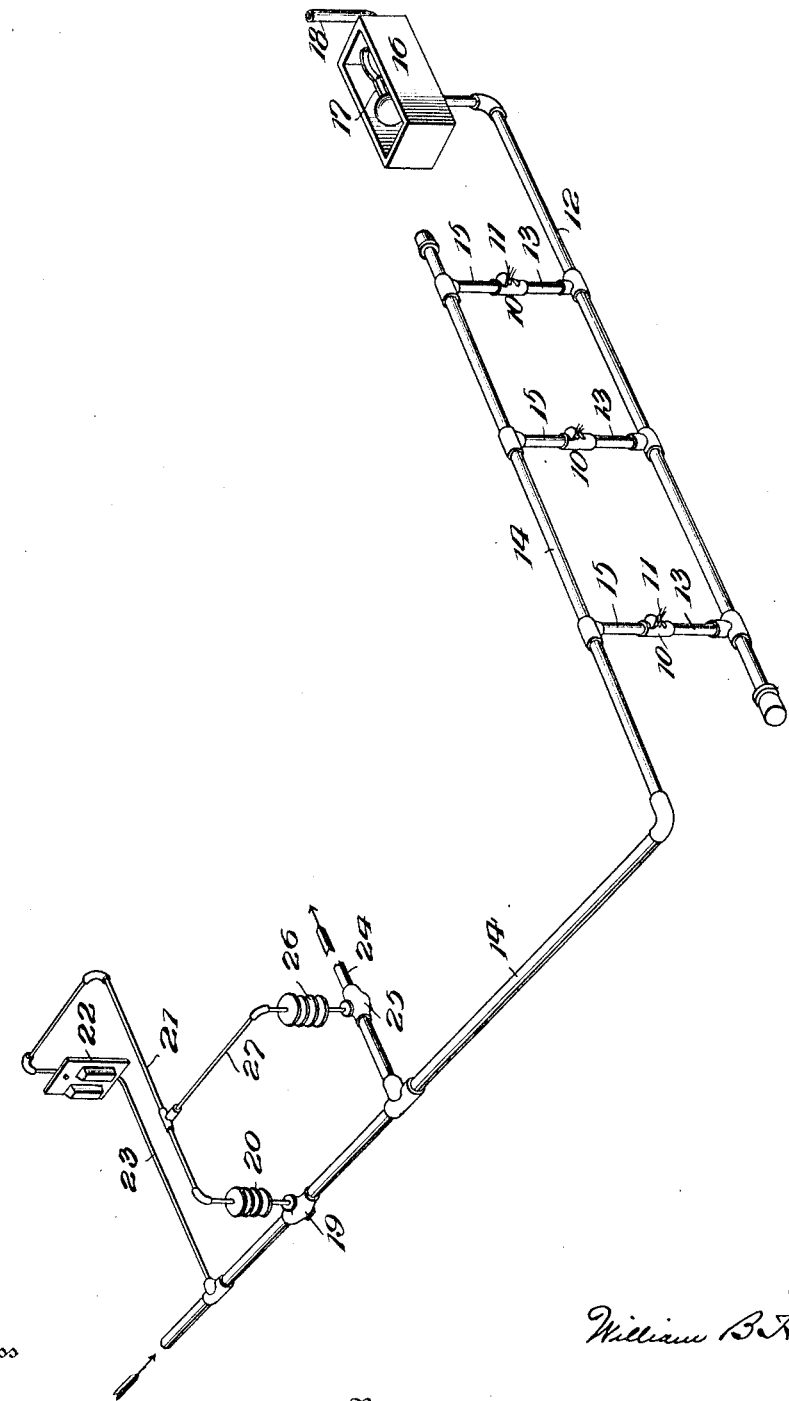

UNITED STATES PATENT OFFICE.

WILLIAM B. HODGE, OF CHARLOTTE, NORTH CAROLINA, ASSIGNOR TO STUART W. CRAMER, OF CHARLOTTE, NORTH CAROLINA.

AUTOMATIC CONTROL FOR HUMIDIFYING APPARATUS.

1,270,159.   Specification of Letters Patent.   Patented June 18, 1918.

Application filed March 21, 1916. Serial No. 85,617.

*To all whom it may concern:*

Be it known that I, WILLIAM B. HODGE, whose post-office address is Court House Square, a citizen of the United States, residing at Charlotte, in the county of Mecklenberg and State of North Carolina, have invented certain new and useful Improvements in Automatic Controls for Humidifying Apparatus; and I do hereby declare the following to be a full, clear, and exact description of the invention, such as will enable others skilled in the art to which it appertains to make and use the same.

The invention relates to the regulation and control of humidifying systems of the type wherein air under pressure is employed for creating a fine spray of atomized or vaporized water for the purpose of imparting a desired degree of humidity to air. In such systems wherein the sprays are regulated by turning on and off the air pressure from some relatively remote controlling station, considerable damage is frequently caused by the fact that the sprays do not cease instantly on the closure of the air valve but drip and "wet down" whatever is situated beneath them. The object of this invention is to remove these and other objections from such systems by means of extremely simple, compact and reliable apparatus as hereinafter disclosed.

Referring to the drawing which is diagrammatic, the system shown comprises a water supply represented by a constant-level tank 16 fed by a water pipe 18 under the control of a float 17. Water from this tank is led by pipe 12 and branches 13 to one or more spray heads or atomizers 10, the liquid orifices wherein are somewhat above the water level. Compressed air or other gaseous fluid is supplied from any suitable source, not shown, through a main conduit or pipe 14 and branches 15 to the several atomizer heads 10, the air orifices of each head being in aspirating relation to the liquid orifices therein as indicated so that when the air pressure is turned on an intensely fine atomized spray is produced at each head, the water being largely vaporized and charged into the surrounding air. It will be understood that these heads are distributed throughout the room to be humidified and may be at widely separated points and also that in the present case they are operated solely by the action of the air pressure. The main air line 14 is controlled automatically by a shut-off valve 19, operated pneumatically by a motor diaphragm 20, by air pressure admitted to it through pipe 21 from an automatic humidity regulator or controller 22 which is itself connected by pipe 23 to the air line 14 on the source side of the valve 19. Variation in the humidity of the room causes the regulator to admit air to and exhaust it from the motor 20 thereby turning on and off the air supply and starting and stopping the atomizer heads accordingly and hence maintaining some constant or average condition of humidity in the room.

In this general type of installation as heretofore employed, experience has shown that, while it is not necessary to provide a shut-off valve in the water pipe or main line 12 in order to stop the action of the atomizer 10, it is not altogether sufficient to turn off the supply of compressed air from the air line 14 because the air pressure in that section of the line between the shut-off valve 19 and the spray heads diminishes gradually and as it becomes less and less the spray dwindles correspondingly, the drops of water becoming coarser and coarser and precipitating in sufficient quantity to cause the objectionable "wetting down." Consequently when a system of this nature is turned on and off there is an objectionable amount of condensation from the atomizers to such an extent that their practical efficiency is greatly impaired, and to eliminate this feature it is desired that after the air supply has been cut off at the shut-off valve provision be made for venting the air remaining in the shut-off section of the pipe 14.

For this purpose the invention contemplates a branch pipe or passage 24 connected to that section of the compressed air conduit or distributing line 14 which runs from the valve 19 to the spray heads. This branch passage constitutes an exhaust or vent for the said section and is controlled by a valve 25 operated automatically by a motor diaphragm device 26 under the influence of air pressure communicated thereto from the regulator 22 through the pipe connections 21 and 27. The two valves 19 and 25 are arranged to act simultaneously and in an opposite sense, that is to say, when the regulator 22 operates to cause the diaphragm 20 to open the main air valve 19 the same operation causes the diaphragm 26 to close the vent valve 25 and vice versa, when the regulator 22 closes 19 it opens 25 and thus the residual pressure of the air in the air line to the spray heads is immediately released or exhausted to atmosphere. Instant cessation of the spray thereby results without tendency to dribble or wet down. The action it will be observed is due to the coincident and inverse control of the shut-off and vent valves.

In the installation and operation of the apparatus, thus provided, the controller 22 is conveniently located in a room, or other compartment, which is to be humidified, and is adjusted for operation at a desired degree of humidity, so that, when a fall in humidity obtains, air is admitted to the diaphragms of the control valves 19 and 25, as above stated, the valve 19 opening to admit air, through the pipe or main 14, to the atomizer heads 10. Just as soon as the humidity of the room has risen to the predetermined point, the controller is thereby affected to cause a reversal in the position of the valves 19 and 25, the former closing off the compressed air supply, and the latter opening the pipe or main 14 to atmosphere, so that the spray heads are instantly renderd inoperative.

In some instances, the water supply may be applied under a slight pressure, and under such circumstances, it will be necessary that a third control valve, not shown, be inserted into the water supply pipe 13, between the tank 16 and the first of the nozzles adjacent thereto, whereby the water supply would be cut off from the atomizers simultaneously with the closing of the control valve 19 and the opening of the control valve 25, a pipe, not shown, connecting the diaphragm of the water control valve to the branch air pipe 21 of the controller.

It is to be understood, however, that various changes in the detail construction and arrangement of the several parts of the apparatus may be resorted to without departing from the spirit of the invention.

Having thus fully described the invention, what is claimed, is:—

1. In a humidifying system a water vaporizing instrumentality having means including a conduit for supplying a gaseous fluid under pressure thereto; means for automatically controlling the flow of gaseous fluid in said conduit including means adapted automatically to release the residual pressure in the section of said conduit leading to the vaporizing instrumentality whereby the latter will be quickly rendered inoperative.

2. In a humidifying system a water vaporizing instrumentality having means including a conduit for supplying a gaseous fluid under pressure thereto; a controlling valve in said conduit, automatically operable means for opening and closing said valve to render operative or inoperative said vaporizing instrumentality and means operable upon the closing of said valve to release the residual pressure of said conduit between said valve and the vaporizing instrumentality whereby the latter will be quickly rendered inoperative.

3. In a humidifying system, a source of pressure supply, a distributing line for said pressure supply, and means for exhausting the working pressure in the line simultaneously with the shutting off of the main pressure from said source.

4. In a humidifying system, a source of pressure supply, a water supply, a distributing line for impressing the pressure on said water supply, and means for exhausting the working pressure in the line simultaneously with the shutting off of the main pressure from its source.

5. A humidifying system comprising sources of air pressure and liquid to be sprayed and one or more spray heads each connected to both said sources and each having an air orifice in aspirating relation to a liquid orifice, a pneumatically-operated shut-off valve in the air-line leading to said heads and an automatic humidity regulator controlling the operation of said valve and simultaneously and inversely controlling a vent in the section shut off thereby.

6. A humidifying system comprising a plurality of spray heads each having a liquid orifice supplied from a constant level liquid source and an air orifice in aspirating relation thereto, a compressed air line leading to said air orifice, a shut-off valve controlling said line, a vent valve for the section shut off, one valve being organized to be open when the other is closed, pneumatic means for operating said valves and an automatic humidity regulator controlling said means in accordance with humidity changes.

7. A humidifying system comprising a plurality of spray heads each having a liquid orifice supplied from a constant level liquid source and an air orifice in aspirating relation thereto, a compressed air line leading to said air orifice, a shut-off valve controlling said line, a vent valve for the section shut off, pneumatic means for simultaneously and inversely operating said valves and connected to said compressed air line and an automatic humidity regulator controlling said pneumatic connection.

8. A humidifying system, a source of pressure supply, a water supply, a spray head connected to both supplies, a distributing line for communicating the pressure to said spray head, a normally open control valve for said distributing line, an exhaust passage connecting with said distributing line between said valve and the spray head, a normally closed control valve for said exhaust passage, and a humidity controlling device for actuating said valves.

9. A humidity system comprising one or more spray heads each connected to a water supply and to a compressed air line and operated by the pressure in the latter, a shut-off valve in the air line, a vent valve controlling the section shut off, separate motor devices for simultaneously and inversely operating said valves, pneumatic connections between said air line and said devices and means for controlling said connections in accordance with humidity changes.

In testimony whereof I affix my signature in presence of two witnesses.

WILLIAM B. HODGE.

Witnesses:
  ROBERT I. DALTON, Jr.,
  JNO. C. WATSON.